Jan. 24, 1956
H. E. GOSS
2,731,718
INSIDE PIPE CUTTER
Filed June 4, 1954
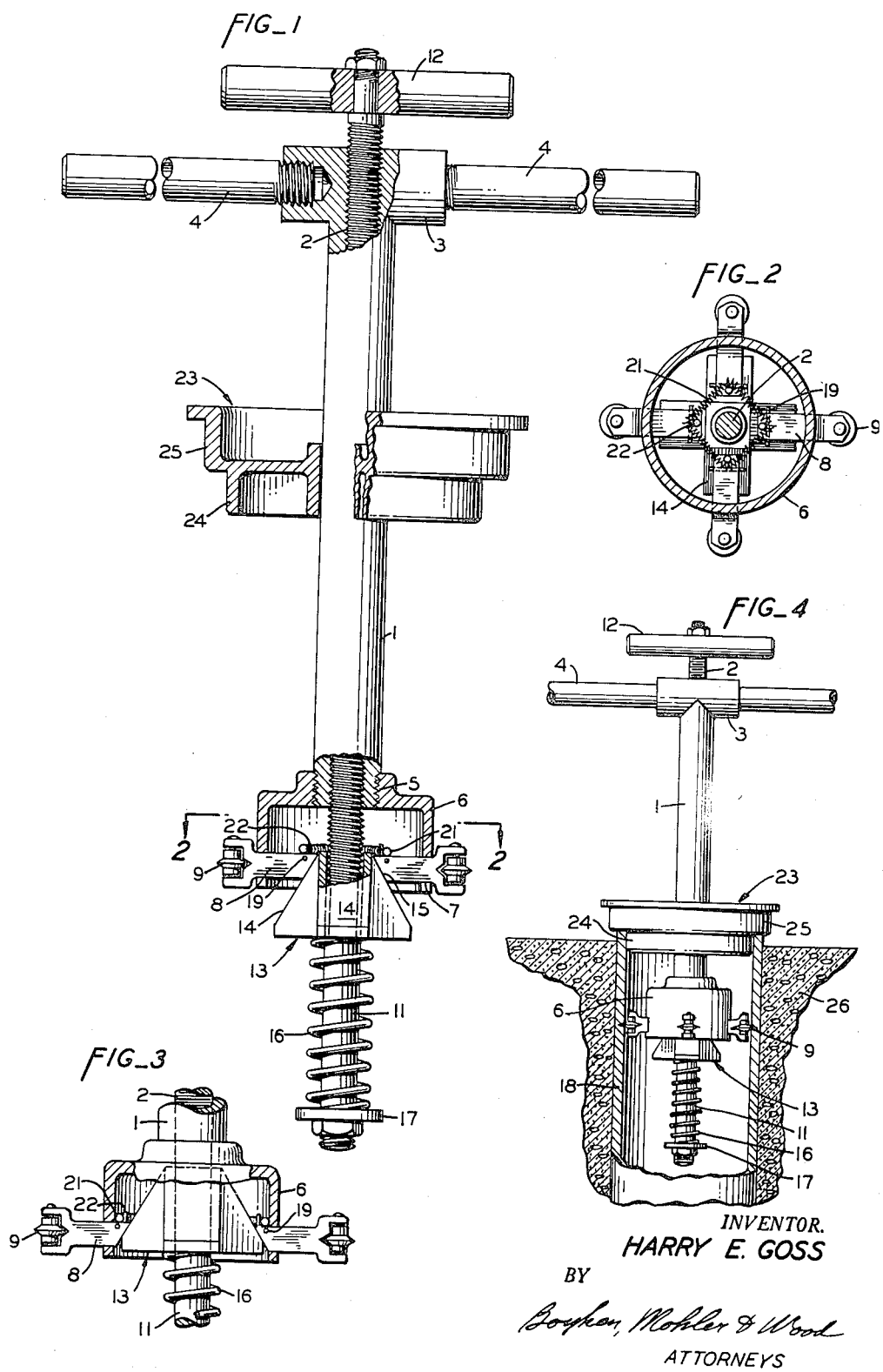
INVENTOR.
HARRY E. GOSS
BY
Boyken, Mohler & Wood
ATTORNEYS United States Patent Office 2,731,718
Patented Jan. 24, 1956

2,731,718
INSIDE PIPE CUTTER
Harry E. Goss, San Francisco, Calif.
Application June 4, 1954, Serial No. 434,430
2 Claims. (Cl. 30—107)

This invention relates to a pipe cutter and more particularly to a device for cutting pipe from the inside thereof.

Heretofore pipe cutters have been adapted to rotate around the outside of a pipe thereby cutting said pipe by scoring or ringing its outside wall with a groove. In such pipe cutters a long hangle has been necessary in order to give sufficient leverage to force the rotatable cutters around the pipe. This, of course, has necessitated substantial clearance around the outside of the pipe in order that the cutter could be operated. No provision has conventionally been made for cutting pipe in close quarters as in a trench, structure etc. where clearance was limited. Hence, conventional methods have dictated that a pipe be pre-cut in the shop or placed in a portable vise for cutting prior to being placed. When it has been required to cut pipe in place undesirable results have been achieved by breaking the pipe with a hammer or wrench or with a cold chisel.

The limited clearance problem has been especially critical in cases such as the installation of drains in a concrete floor where vertical laterals have been connected to drain or screened fittings. Such fittings have normally been placed after the floor has been poured over the mains and around the laterals connecting to and upstanding therefrom. In order to position the fitting flush with the floor the laterals (which are normally left standing above the floor level) must be cut off at the correct height (usually six inches or less below the floor level) to correctly place the fitting with respect thereto. In such cases the floor has had to be poured short of such laterals or later broken away and repoured after allowing access to the outside of the lateral pipe for cutting by conventional cutters. As an alternative the extra top length of the lateral pipe has been broken away with a hammer, cold chisel, and the like leaving a rugged, damaged, and undesirable resultant edge.

Furthermore, cutting a pipe from the outside thereof by conventional methods leaves a burr on the inside of the cut edge where the pipe material has been deformed. This renders the pipe so cut susceptible to clogging and the like.

This invention contemplates a pipe cutter which overcomes the above objections of conventional cutters by providing means for cutting pipe from the inside thereof. This invention requires no clearance around the outside of the pipe and can therefore be used in otherwise inaccessible locations where only the open end of the pipe can be reached.

In addition, cutting pipe with the device of this invention leaves the inside of the pipe clean and free from burrs and the like. Furthermore, this cutter is flexible so as to accommodate deformed pipes which may be other than exactly circular in cross section and is provided with guiding means to insure that the multiple cutters thereof correctly "track" one in the path of the others.

It is, therefore, a primary object of this invention to provide a pipe cutter which will operate in circumstances of limited clearance.

Another object of this invention is the provision of a cutter which cuts pipe from the inside thereof.

It is still another object of this invention to provide a pipe cutter including flexible means for insuring cutter contact with pipes other than those having strictly circular cross sections.

Yet another object of this invention is the provision of a pipe cutter which is expandable for varying pipe sizes.

Other objects and advantages will become apparent from the following description taken in connection with the accompanying drawings in which:

Fig. 1 is a side elevational view of the pipe cutter of this invention partially broken away to show structure;

Fig. 2 is a cross-sectional view taken along line 2—2 of Fig. 1;

Fig. 3 is a side elevational view of a portion of the device of Fig. 1 showing the cutting wheels in an extended position; and Fig. 4 is a vertical sectional view of a pipe extending upwardly through a concrete floor and showing the device of this invention in operation.

In detail, Fig. 1 shows this invention as comprising an elongated tubular handle 1 having internal threads 2 and a T-portion 3 at the upper end thereof. Threadedly secured to and extending normal to the longitudinal axis of handle 1 are cross members 4 for applying a rotative force to handle 1.

Secured as by threads 5 to the lower end of handle 1 is coaxial housing 6 having a plurality of bearing apertures 7 opening radially therethrough. Mounted for reciprocation in said apertures are radially extending fingers 8 having cutting wheels 9 rotatably mounted at the outer end thereof for rotation about an axis parallel to the longitudinal axis of handle 1. It should be noted that a variety of types of cutting wheels may be used depending upon the material of the pipe to be cut; the wide flare wheels shown being adaptable for sand case iron pipe.

Threaded through handle 1 and extending out of the lower end of housing 6 is rod 11 having a turning lever 12 secured to the upper end thereof spaced slightly upwardly from cross members 4. Slidably mounted on rod 11 adjacent housing 6 is wedge member 13 having slanted faces 14 in engagement with the inner, mating ends 15 of fingers 8. Helical compression spring 16 is mounted on the lower end of rod 11 so as to coact between flange 17 on rod 11 and the lower end of member 13.

It will be seen that threadedly withdrawing rod 11 upwardly in handle 1 by turning lever 12 causes spring 16 to yieldably urge fingers 8 and cutters 9 radially outwardly from housing 6 and into contact with the inside wall of a pipe 18 (Fig. 4) in which said housing is inserted. Fig. 3 shows rod 11 fully withdrawn and fingers 8 extended their full length for cutting the largest size pipe of which the device of this invention is capable. When this invention is in the position shown in Fig. 4 rotating handle 1 by means of cross members 4 causes cutting wheels 9 to track around the inside wall of pipe 18 thereby scoring and cutting said pipe. The wide flare wheel 9 is adapted to cut sand cast iron pipe which is somewhat brittle and will fracture around the scored line scribed with this invention.

An important feature of this invention is its ability to cut varying sizes of pipe by the use of extensible fingers 8 and without the need for changing the basic structure of the device. In order that fingers 8 do not slide completely out of housing 6 a pin stop such as cutter key 19 may be provided at the inner end of finger 8. If it is desired that fingers 8 be automatically retracted as wedge member 13 is lowered, coil spring 21 may be provided encircling upstanding pins 22 on the inner end of each finger 8 so as to hold mating ends 15 of said fingers in contact with slanted faces 14 of member 13.

In addition, guide cap 23 may be slidably mounted on handle 1 for the purpose of engaging the open end of pipe 18 and thereby centering the device of this invention to insure that cutting wheels 9 will each track in a single horizontal plane around the interior of said pipe. Figs. 1, 4 show cap 23 as having a pair of steps 24, 25 for engaging pipes of different diameters as seen in Fig. 4.

With the device of this invention a pipe 18, completely surrounded by concrete 26 or the like (Fig. 4), may be cleanly cut from the inside. The provision of spring 16 not only yieldably urges cutters 9 into engagement with pipe 18 to prevent unduly straining any portion of this invention, but also provides for yieldability of certain of cutters 9 and fingers 8 in the event that pipe 18 is somewhat deformed from an exactly circular cross-section.

Although this invention has been described and illustrated in detail such is not to be taken as restrictive thereof, it being obvious that modifications could be made therein without departing from the spirit and scope of the invention.

I claim:

1. A device for scoring pipe circumferentially thereof comprising an elongated, internally threaded, tubular handle, a coaxial housing secured to one end of said handle and provided with radial apertures therethrough, a plurality of radially extending fingers having cutting wheels mounted at the outer ends therof and radially reciprocable in said apertures with said cutting wheels outside said housing, a rod threadedly received through said handle and extending through said housing and between the inner ends of said fingers, a wedge member slidably mounted on said rod, spaced from said one end of said handle, and having slanted faces in engagement with said inner ends of said fingers, and a spring coacting between said rod and said member whereby when said housing is inserted into a pipe to be scored and said rod is threaded through said handle said wedge member yieldably urges said cutting wheels into engagement with the inside wall of said pipe for scoring said pipe as said handle is rotated about its longitudinal axis.

2. A device for scoring pipe circumferentially thereof comprising an elongated, internally threaded, tubular handle, a coaxial housing secured to one end of said handle provided with radial apertures therethrough, a plurality of radially extending fingers having cutting wheels mounted at the outer ends thereof and radially reciprocable in said apertures with said cutting wheels outside said housing, a rod threadedly received through said handle and extending through said housing and between the inner ends of said fingers, a wedge member slidably mounted on said rod, spaced from said one end of said handle, and having slanted faces in engagement with said inner ends of said fingers, spring means for holding said inner ends of said fingers in engagement with said slanted faces, and a coaxial guide cap slidably mounted on said handle, to be in engagement with the open end of a pipe in which said housing is adapted to be inserted and for centering said device with respect to said pipe whereby when said housing is inserted into a pipe to be scored and said rod is threaded through said handle said wedge member yieldably urges said cutting wheels into engagement with the inside wall of said pipe for scoring said pipe as said handle is rotated about its longitudinal axis.

References Cited in the file of this patent

UNITED STATES PATENTS

| Number | Name | Date |
|---|---|---|
| 303,556 | Bushor | Aug. 12, 1884 |
| 482,496 | Coppage | Sept. 13, 1892 |
| 531,662 | Thieme | Jan. 1, 1895 |
| 542,219 | Fitzpatrick | July 2, 1895 |
| 733,642 | Groble | July 14, 1903 |
| 778,293 | Wiedeke | Dec. 27, 1904 |
| 794,337 | Blevins | July 11, 1905 |
| 890,795 | Putsch | June 16, 1908 |
| 910,547 | Kohler | Jan. 26, 1909 |
| 956,805 | Heller et al. | May 3, 1910 |